(12) United States Patent
Boyd et al.

(10) Patent No.: US 7,907,604 B2
(45) Date of Patent: *Mar. 15, 2011

(54) CREATION AND MANAGEMENT OF ROUTING TABLE FOR PCI BUS ADDRESS BASED ROUTING WITH INTEGRATED DID

(75) Inventors: William T. Boyd, Poughkeepsie, NY (US); Douglas M. Fremiuth, New York, NY (US); William G. Holland, Cary, NC (US); Steven W. Hunter, Raleigh, NC (US); Renato J. Recio, Austin, TX (US); Steven M. Thurber, Austin, TX (US); Madeline Vega, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/134,952

(22) Filed: Jun. 6, 2008

(65) Prior Publication Data
US 2008/0235430 A1 Sep. 25, 2008

Related U.S. Application Data

(63) Continuation of application No. 11/334,678, filed on Jan. 18, 2006, now abandoned.

(51) Int. Cl.
*H04L 12/28* (2006.01)
*H04L 12/56* (2006.01)
*G06F 3/00* (2006.01)
*G06F 13/36* (2006.01)

(52) U.S. Cl. .................. 370/359; 370/395.31; 370/421; 710/4; 710/12; 710/311

(58) Field of Classification Search .................. None
See application file for complete search history.

(56) References Cited

U.S. PATENT DOCUMENTS
5,257,353 A 10/1993 Blanck et al.
(Continued)

FOREIGN PATENT DOCUMENTS
WO 2006089914 A1 8/2006

OTHER PUBLICATIONS
U.S. Appl. No. 11/567,411, filed Dec. 6, 2006, Boyd et al.
(Continued)

*Primary Examiner* — Chirag G Shah
*Assistant Examiner* — Suk Jin Kang
(74) *Attorney, Agent, or Firm* — Mitch Harris, Atty at Law, LLC; Andrew M. Harris; Matthew W. Baca (57) ABSTRACT

Routing between multiple hosts and adapters in a PCI environment is provided by a method and system. A Destination Identification (DID) field is inserted in a field of the PCI bus address (PBA) of transaction packets dispatched through PCI switches. A particular DID is associated with a particular host or system image, and thus identifies the physical or virtual end point of the packets. The method and system may track connections such that when particular host of a root node becomes connected to a specified switch, a PCI Configuration Master (PCM), residing in one of the root nodes, is operated to enter a destination identifier or DID into a table. The DID is then inserted in the PBA of packets directed through the specified switch from the particular host to one of the adapters.

18 Claims, 9 Drawing Sheets

U.S. PATENT DOCUMENTS

| | | | |
|---|---|---|---|
| 5,367,695 A | 11/1994 | Narad et al. | |
| 5,392,328 A | 2/1995 | Schmidt et al. | |
| 5,960,213 A | 9/1999 | Wilson | |
| 5,968,189 A | 10/1999 | Desnoyers et al. | |
| 6,061,753 A | 5/2000 | Ericson | |
| 6,662,251 B2 | 12/2003 | Brock et al. | |
| 6,691,184 B2 | 2/2004 | Odenwald et al. | |
| 6,769,021 B1 | 7/2004 | Bradley et al. | |
| 6,775,750 B2 | 8/2004 | Krueger | |
| 6,813,653 B2 | 11/2004 | Avery | |
| 6,901,451 B1* | 5/2005 | Miyoshi et al. | 709/232 |
| 6,907,510 B2 | 6/2005 | Bennett et al. | |
| 7,036,122 B2 | 4/2006 | Bennett et al. | |
| 7,096,305 B2 | 8/2006 | Moll | |
| 7,103,064 B2 | 9/2006 | Petty et al. | |
| 7,134,052 B2 | 11/2006 | Bailey et al. | |
| 7,174,413 B2 | 2/2007 | Pettey et al. | |
| 7,188,209 B2 | 3/2007 | Pettey et al. | |
| 7,194,538 B1 | 3/2007 | Rabe et al. | |
| 7,363,389 B2 | 4/2008 | Collins et al. | |
| 7,398,337 B2 | 7/2008 | Arndt et al. | |
| 7,694,047 B1* | 4/2010 | Alston | 710/62 |
| 2002/0144001 A1 | 10/2002 | Collins et al. | |
| 2002/0161937 A1 | 10/2002 | Odenwald et al. | |
| 2002/0172195 A1* | 11/2002 | Pekkala et al. | 370/360 |
| 2002/0188701 A1 | 12/2002 | Brown et al. | |
| 2003/0221030 A1 | 11/2003 | Pontius et al. | |
| 2004/0015622 A1 | 1/2004 | Avery | |
| 2004/0025166 A1 | 2/2004 | Adlung et al. | |
| 2004/0039986 A1 | 2/2004 | Solomon et al. | |
| 2004/0123014 A1 | 6/2004 | Schaefer et al. | |
| 2004/0172494 A1 | 9/2004 | Pettey et al. | |
| 2004/0179534 A1 | 9/2004 | Pettey et al. | |
| 2004/0210754 A1 | 10/2004 | Barron et al. | |
| 2004/0230709 A1 | 11/2004 | Moll | |
| 2004/0230735 A1 | 11/2004 | Moll | |
| 2005/0025119 A1 | 2/2005 | Pettey et al. | |
| 2005/0044301 A1 | 2/2005 | Vasilevsky et al. | |
| 2005/0102682 A1 | 5/2005 | Shah et al. | |
| 2005/0147117 A1 | 7/2005 | Pettey et al. | |
| 2005/0188116 A1 | 8/2005 | Brown et al. | |
| 2005/0228531 A1 | 10/2005 | Genovker et al. | |
| 2005/0270988 A1 | 12/2005 | DeHaemer | |
| 2006/0168361 A1 | 7/2006 | Brown et al. | |
| 2006/0174094 A1 | 8/2006 | Lloyd et al. | |
| 2006/0179195 A1 | 8/2006 | Sharma et al. | |
| 2006/0179238 A1 | 8/2006 | Griswell, Jr. et al. | |
| 2006/0179239 A1 | 8/2006 | Fluhr et al. | |
| 2006/0179265 A1 | 8/2006 | Flood et al. | |
| 2006/0179266 A1 | 8/2006 | Flood et al. | |
| 2006/0184711 A1 | 8/2006 | Pettey et al. | |
| 2006/0184767 A1 | 8/2006 | Le et al. | |
| 2006/0184768 A1 | 8/2006 | Bishop et al. | |
| 2006/0184769 A1 | 8/2006 | Floyd et al. | |
| 2006/0184770 A1 | 8/2006 | Bishop et al. | |
| 2006/0184946 A1 | 8/2006 | Bishop et al. | |
| 2006/0195617 A1 | 8/2006 | Arndt et al. | |
| 2006/0195619 A1 | 8/2006 | Arndt et al. | |
| 2006/0195634 A1 | 8/2006 | Arndt et al. | |
| 2006/0195642 A1 | 8/2006 | Arndt et al. | |
| 2006/0195644 A1 | 8/2006 | Arndt et al. | |
| 2006/0195663 A1 | 8/2006 | Arndt et al. | |
| 2006/0195673 A1 | 8/2006 | Arndt et al. | |
| 2006/0195675 A1 | 8/2006 | Arndt et al. | |
| 2006/0195848 A1 | 8/2006 | Arndt et al. | |
| 2006/0206655 A1 | 9/2006 | Chappell et al. | |
| 2006/0206936 A1 | 9/2006 | Liang et al. | |
| 2006/0209863 A1 | 9/2006 | Arndt et al. | |
| 2006/0212608 A1 | 9/2006 | Arndt et al. | |
| 2006/0212620 A1 | 9/2006 | Arndt et al. | |
| 2006/0212870 A1 | 9/2006 | Arndt et al. | |
| 2006/0224790 A1 | 10/2006 | Arndt et al. | |
| 2006/0230181 A1 | 10/2006 | Riley | |
| 2006/0230217 A1 | 10/2006 | Moll | |
| 2006/0239287 A1 | 10/2006 | Johnsen et al. | |
| 2006/0242333 A1 | 10/2006 | Johnsen et al. | |
| 2006/0242352 A1 | 10/2006 | Torudbakken et al. | |
| 2006/0242354 A1 | 10/2006 | Johnsen et al. | |
| 2006/0253619 A1 | 11/2006 | Torudbakken et al. | |
| 2006/0271820 A1 | 11/2006 | Mack et al. | |
| 2007/0019637 A1 | 1/2007 | Boyd et al. | |
| 2007/0027952 A1 | 2/2007 | Boyd et al. | |
| 2007/0097871 A1 | 5/2007 | Boyd et al. | |
| 2007/0097948 A1 | 5/2007 | Boyd et al. | |
| 2007/0097949 A1 | 5/2007 | Boyd et al. | |
| 2007/0097950 A1 | 5/2007 | Boyd et al. | |
| 2007/0101016 A1 | 5/2007 | Boyd et al. | |
| 2007/0136458 A1 | 6/2007 | Boyd et al. | |
| 2007/0174733 A1 | 7/2007 | Boyd et al. | |
| 2007/0183393 A1 | 8/2007 | Boyd et al. | |
| 2007/0186025 A1 | 8/2007 | Boyd et al. | |

OTHER PUBLICATIONS

U.S. Appl. No. 11/567,425, filed Dec. 6, 2006, Boyd et al.

* cited by examiner

| PCI ADDRESS SPACE | | |
|---|---|---|
| HIGH @ BITS (e.g. 16 BITS) | LOW @ BITS (e.g. 48 BITS) | ADDRESS TYPE |
| x0000 | x0000 0000 0000 xFFFF FFFF FFFF | ROOT COMPLEX 1 |
| x0001 | x0000 0000 0000 xFFFF FFFF FFFF | ROOT COMPLEX 2 |
| x0002 | x0000 0000 0000 xFFFF FFFF FFFF | ROOT COMPLEX 3 |
| x0003 | x0000 0000 0000 xFFFF FFFF FFFF | VIRTUAL END POINT 1 |
| x0004 | x0000 0000 0000 xFFFF FFFF FFFF | VIRTUAL END POINT 2 |

402 — Root Complex 1
404 — Root Complex 2
406 — Root Complex 3
408 — Virtual End Point 1
410 — Virtual End Point 2

INTEGRATED DID | ASSIGNED ADDRESS RANGE

CREATION AND MANAGEMENT OF ROUTING TABLE FOR PCI BUS ADDRESS BASED ROUTING WITH INTEGRATED DID

This application is a continuation of application Ser. No. 11/334,678, filed Jan. 18, 2006, status pending.

BACKGROUND OF THE INVENTION

1. Field of the Invention

The invention disclosed and claimed herein generally pertains to a method and related apparatus for routing PCIe transaction packets between multiple hosts and adapters, through a PCIe switched-fabric. More particularly, the invention pertains to a method for creating and managing the structures needed for routing PCI transaction packets between multiple hosts and adapters when using a Destination Identification (DID) that is integrated into the PBA.

2. Description of the Related Art

As is well known by those of skill in the art, PCI Express (PCIe) is widely used in computer systems to interconnect host units to adapters or other components, by means of a PCI switched-fabric bus or the like. However, PCIe currently does not permit the sharing of input/output (I/O) adapters in topologies where there are multiple hosts with multiple shared PCIe links. As a result, even though such sharing capability could be very valuable when using blade clusters or other clustered servers, adapters for PCIe and secondary networks (e.g., FC, IB, Enet) are at present generally placed only into individual blades and server systems. Thus, such adapters cannot be shared between clustered blades, or even between multiple roots within a clustered system.

In an environment containing multiple blades or blade clusters, it can be very costly to dedicate a PCI adapter for use with only a single blade. For example, a 10 Gigabit Ethernet (10 GigE) adapter currently costs on the order of $6,000. The inability to share these expensive adapters between blades has, in fact, contributed to the slow adoption rate of certain new network technologies such as 10 GigE. Moreover, there is a constraint imposed by the limited space available in blades to accommodate I/O adapters. This problem of limited space could be overcome if a PC network was able to support attachment of multiple hosts to a single PCI adapter, so that virtual PCIe I/O adapters could be shared between the multiple hosts.

In order to allow virtualization of PCIe adapters in the above environment, a mechanism is required for creating and managing the structures needed for routing PCI transaction packets between multiple hosts and adapters. The mechanism must be designed so that it protects memory and data in the system image of one host from being accessed by unauthorized applications in system images of other hosts. Access by other adapters in the same PCI tree must also be prevented. Moreover, implementation of the mechanism should minimize changes that must be made to currently used PCI hardware.

SUMMARY OF THE INVENTION

The invention is generally directed to the provision and management of tables for routing packets through an environment that includes multiple hosts and shared PCIe switches and adapters. The invention features modification of a conventional PCI Bus Address (PBA) by including a Destination Identification (DID) field in the PBA. Thus, the DID field is embedded in a transaction packet dispatched through the PCIe switches, and is integrated into the PCI address. A particular DID is associated with a particular host or system image, and thus identifies the physical or virtual end point of its packet. One useful embodiment of the invention is directed to a method for creating and managing the structures needed for routing PCIe transaction packets through PCIe switches in a distributed computer system comprising multiple root nodes, wherein each root node includes one or more hosts. The system further includes one or more PCI adapters. A physical tree that is indicative of a physical configuration of the distributed computing system is determined, and a virtual tree is created from the physical tree. The virtual tree is then modified to change an association between at least one source device and at least one target device in the virtual tree. A validation mechanism validates the changed association between the at least one source device and the at least one target device to enable routing of data from the at least one source device to the at least one target device.

DETAILED DESCRIPTION OF THE PREFERRED EMBODIMENT

Figure 1:
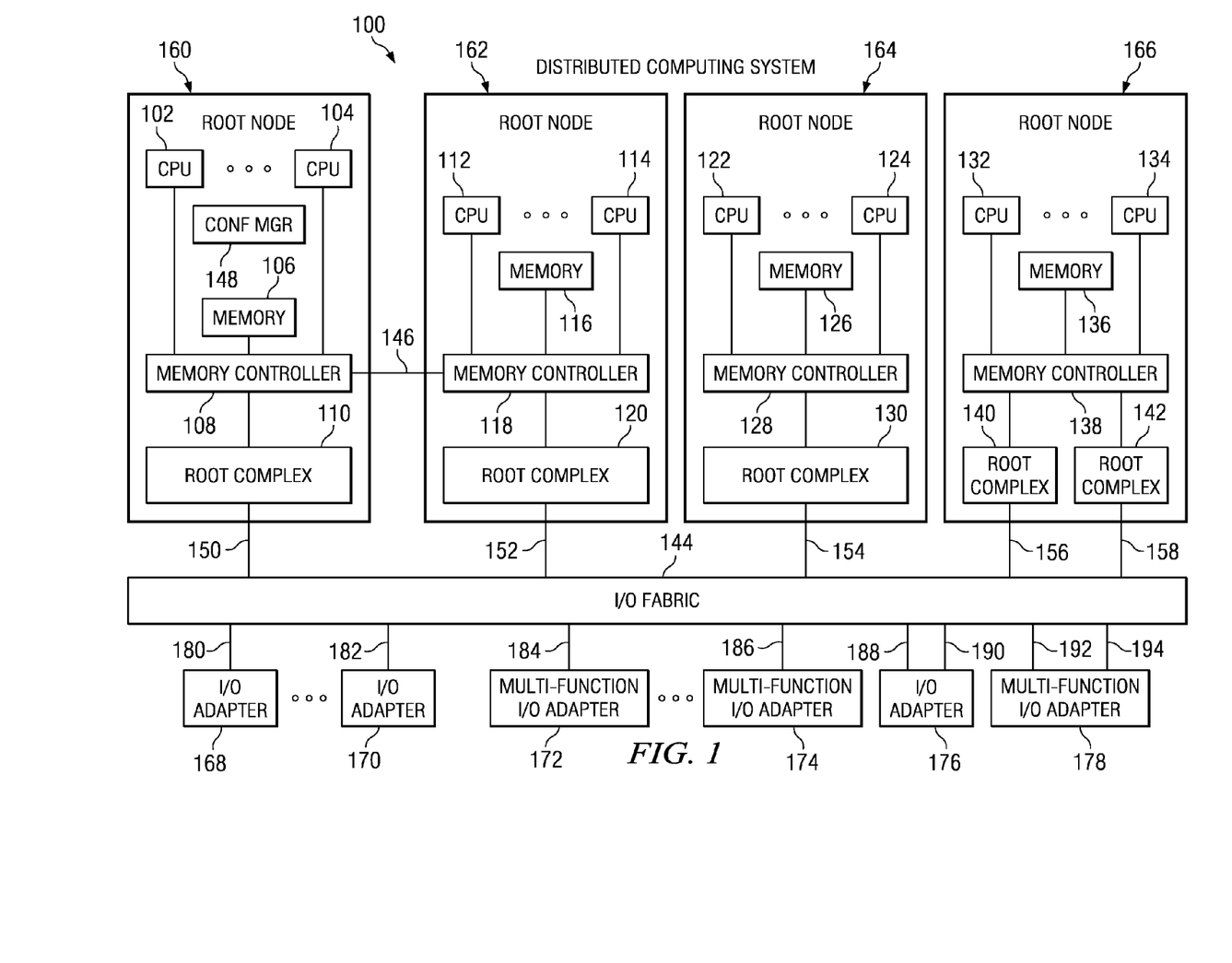
FIG. 1 is a block diagram showing a generic distributed computer system for use with an embodiment of the invention.

FIG. 1 shows a distributed computer system 100 comprising a preferred embodiment of the present invention. The distributed computer system 100 in FIG. 1 takes the form of multiple root complexes (RCs) 110, 120, 130, 140 and 142, respectively connected to an I/O switched-fabric bus 144 through I/O links 150, 152, 154, 156 and 158, and to the memory controllers 108, 118, 128 and 138 of the root nodes (RNs) 160-166. The I/O fabric is attached to I/O adapters (IOAs) 168-178 through links 180-194. The IOAs may be single function, such as IOAs 168-170 and 176, or multiple function, such as IOAs 172-174 and 178. Moreover, respective IOAs may be connected to the I/O fabric 144 via single links, such as links 180-186, or with multiple links for redundancy, such as links 188-194.

The RCs 110, 120, and 130 are integral components of RN 160, 162 and 164, respectively. There may be more than one RC in an RN, such as RCs 140 and 142 which are both integral components of RN 166. In addition to the RCs, each RN consists of one or more Central Processing Units (CPUs) 102-104, 112-114, 122-124 and 132-134, memories 106, 116, 126 and 136, and memory controllers 108, 118, 128 and 138. The memory controllers respectively interconnect the CPUs, memory, and I/O RCs of their corresponding RNs, and perform such functions as handling the coherency traffic for respective memories.

RN's may be connected together at their memory controllers, such as by a link 146 extending between memory controllers 108 and 118 of RNs 160 and 162. This forms one coherency domain which may act as a single Symmetric Multi-Processing (SMP) system. Alternatively, nodes may be independent from one another with separate coherency domains as in RNs 164 and 166.

FIG. 1 shows a PCI Configuration Manager (PCM) 148 incorporated into one of the RNs, such as RN 160, as an integral component thereof. The PCM configures the shared resources of the I/O fabric and assigns resources to the RNs.

Distributed computing system 100 may be implemented using various commercially available computer systems. For example, distributed computing system 100 may be implemented using an IBM eServer iSeries Model 840 system available from International Business Machines Corporation. Such a system may support logical partitioning using an OS/400 operating system, which is also available from International Business Machines Corporation.

Those of ordinary skill in the art will appreciate that the hardware depicted in FIG. 1 may vary. For example, other peripheral devices, such as optical disk drives and the like, also may be used in addition to or in place of the hardware depicted. The depicted example is not meant to imply architectural limitations with respect to the present invention.

Figure 2:
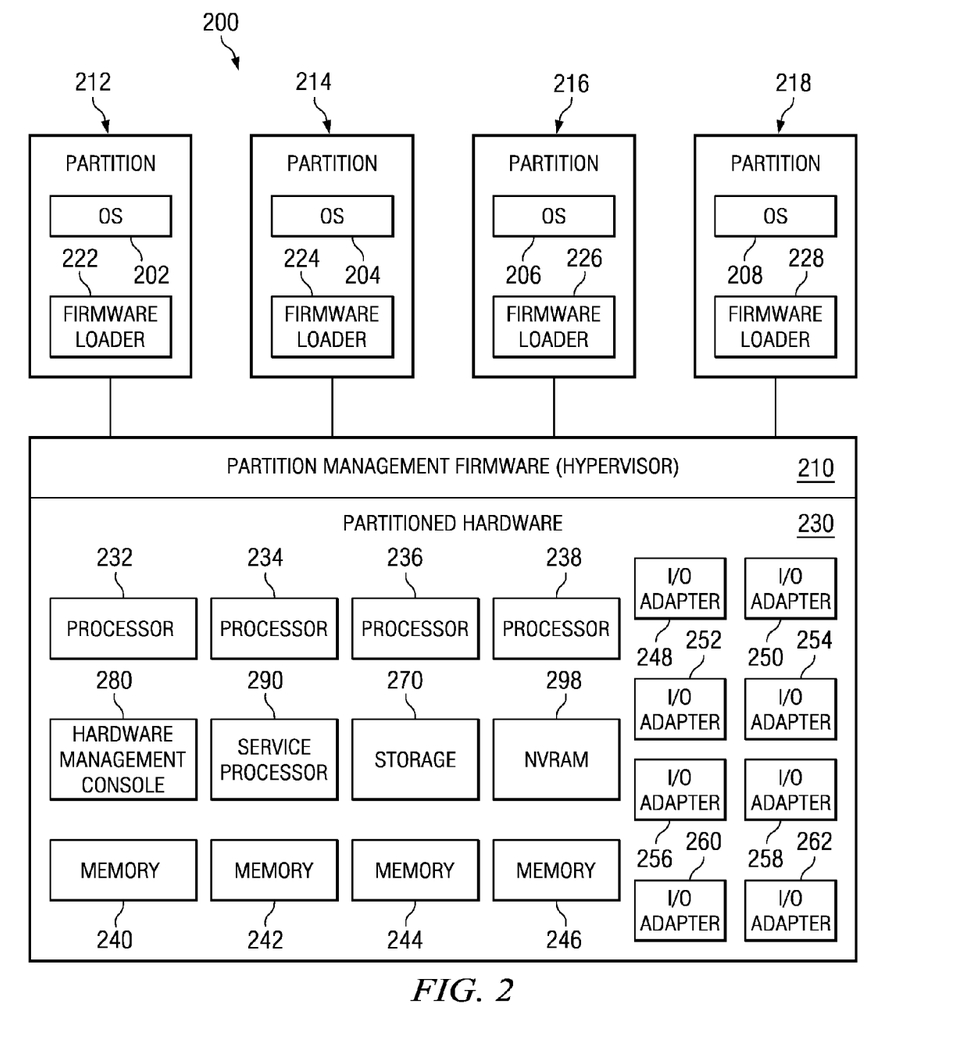
FIG. 2 is a block diagram showing an exemplary logical partition platform in the system of FIG. 1.

With reference to FIG. 2, a block diagram of an exemplary logical partitioned platform 200 is depicted in which the present invention may be implemented. The hardware in logically partitioned platform 200 may be implemented as, for example, data processing system 100 in FIG. 1. Logically partitioned platform 200 includes partitioned hardware 230, operating systems 202, 204, 206, 208 and hypervisor 210. Operating systems 202, 204, 206 and 208 may be multiple copies of a single operating system, or may be multiple heterogeneous operating systems simultaneously run on platform 200. These operating systems may be implemented using OS/400, which is designed to interface with a hypervisor. Operating systems 202, 204, 206 and 208 are located in partitions 212, 214, 216 and 218, respectively. Additionally, these partitions respectively include firmware loaders 222, 224, 226 and 228. When partitions 212, 214, 216 and 218 are instantiated, a copy of open firmware is loaded into each partition by the hypervisor's partition manager. The processors associated or assigned to the partitions are then dispatched to the partitions' memory to execute the partition firmware.

Partitioned hardware 230 includes a plurality of processors 232-238, a plurality of system memory units 240-246, a plurality of input/output (I/O) adapters 248-262, and a storage unit 270. Partition hardware 230 also includes service processor 290, which may be used to provide various services, such as processing of errors in the partitions. Each of the processors 232-238, memory units 240-246, NVRAM 298, and I/O adapters 248-262 may be assigned to one of multiple partitions within logically partitioned platform 200, each of which corresponds to one of operating systems 202, 204, 206 and 208.

Partition management firmware (hypervisor) 210 performs a number of functions and services for partitions 212, 214, 216 and 218 to create and enforce the partitioning of logically partitioned platform 200. Hypervisor 210 is a firmware implemented virtual machine identical to the underlying hardware. Hypervisor software is available from International Business Machines Corporation. Firmware is "software" stored in a memory chip that holds its content without electrical power, such as, for example, read-only memory (ROM), programmable ROM (PROM), electrically erasable programmable ROM (EEPROM), and non-volatile random access memory (NVRAM). Thus, hypervisor 210 allows the simultaneous execution of independent OS images 202, 204, 206 and 208 by virtualizing all the hardware resources of logically partitioned platform 200.

Operation of the different partitions may be controlled through a hardware management console, such as hardware management console 280. Hardware management console 280 is a separate distributed computing system from which a system administrator may perform various functions including reallocation of resources to different partitions.

In an environment of the type shown in FIG. 2, it is not permissible for resources or programs in one partition to affect operations in another partition. Moreover, to be useful, the assignment of resources needs to be fine-grained. For example, it is often not acceptable to assign all IOAs under a particular PHB to the same partition, as that will restrict configurability of the system, including the ability to dynamically move resources between partitions.

Accordingly, some functionality is needed in the bridges that connect IOAs to the I/O bus so as to be able to assign resources, such as individual IOAs or parts of IOAs to separate partitions; and, at the same time, prevent the assigned resources from affecting other partitions such as by obtaining access to resources of the other partitions.

Figure 3:
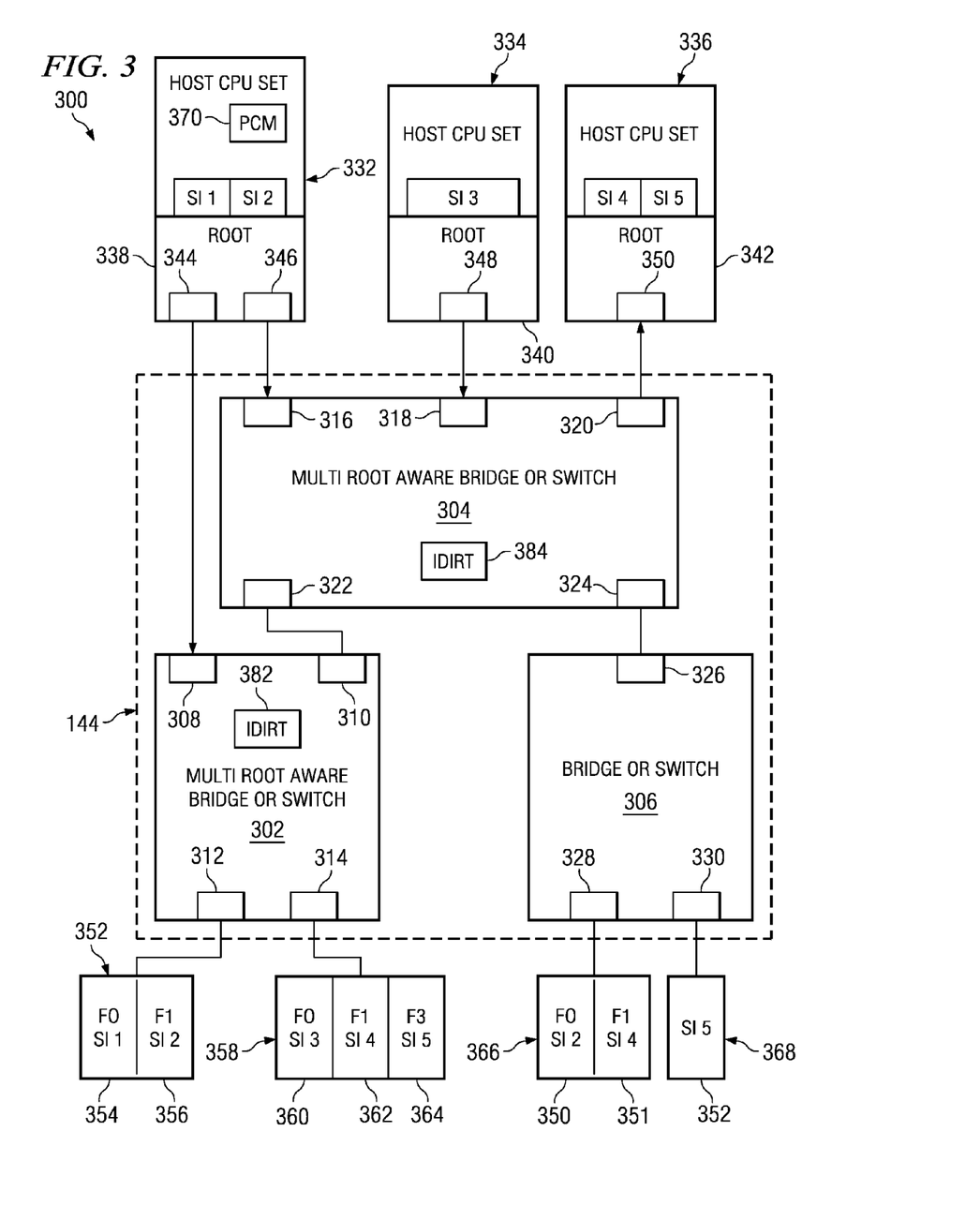
FIG. 3 is a block diagram showing a distributed computer system in further detail, wherein the system of FIG. 3 is adapted to implement an embodiment of the invention.

Referring to FIG. 3, there is shown a distributed computer system 300 that includes a more detailed representation of the I/O switched-fabric 144 depicted in FIG. 1. More particularly, to further illustrate the concept of a PCI fabric that supports multiple root nodes through the use of multiple switches, fabric 144 is shown in FIG. 3 to comprise a plurality of PCI switches (or bridges) 302, 304 and 306, wherein switches 302 and 304 are multi-root aware switches. FIG. 3 further shows switches 302, 304 and 306 provided with ports 308-314, 316-324 and 326-330, respectively. It is to be understood that the term "switch", when used herein by itself, may include both switches and bridges. The term "bridge" as used herein generally pertains to a device for connecting two segments of a network that use the same protocol.

Figure 4:
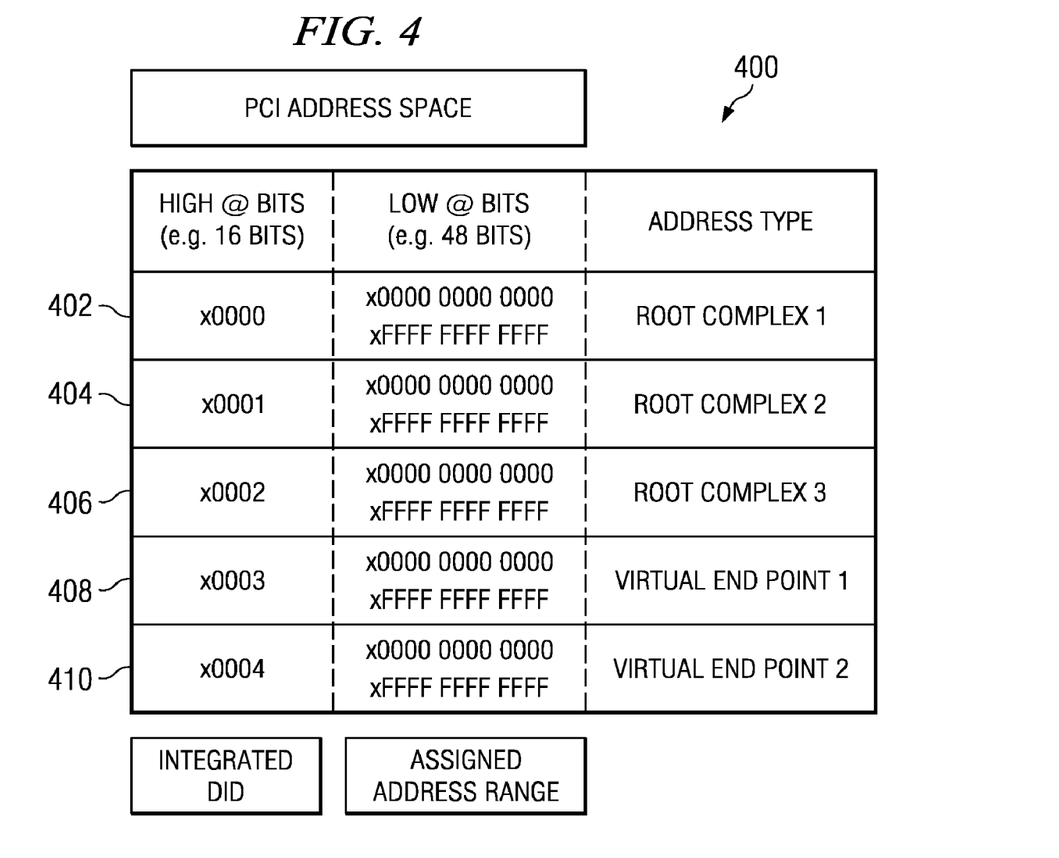
FIG. 4 is a schematic diagram depicting several PCI Bus Addresses, each with an integrated DID component and associated with either a Root Complex or a Virtual End Point for use in an embodiment of the invention.
Figure 5:
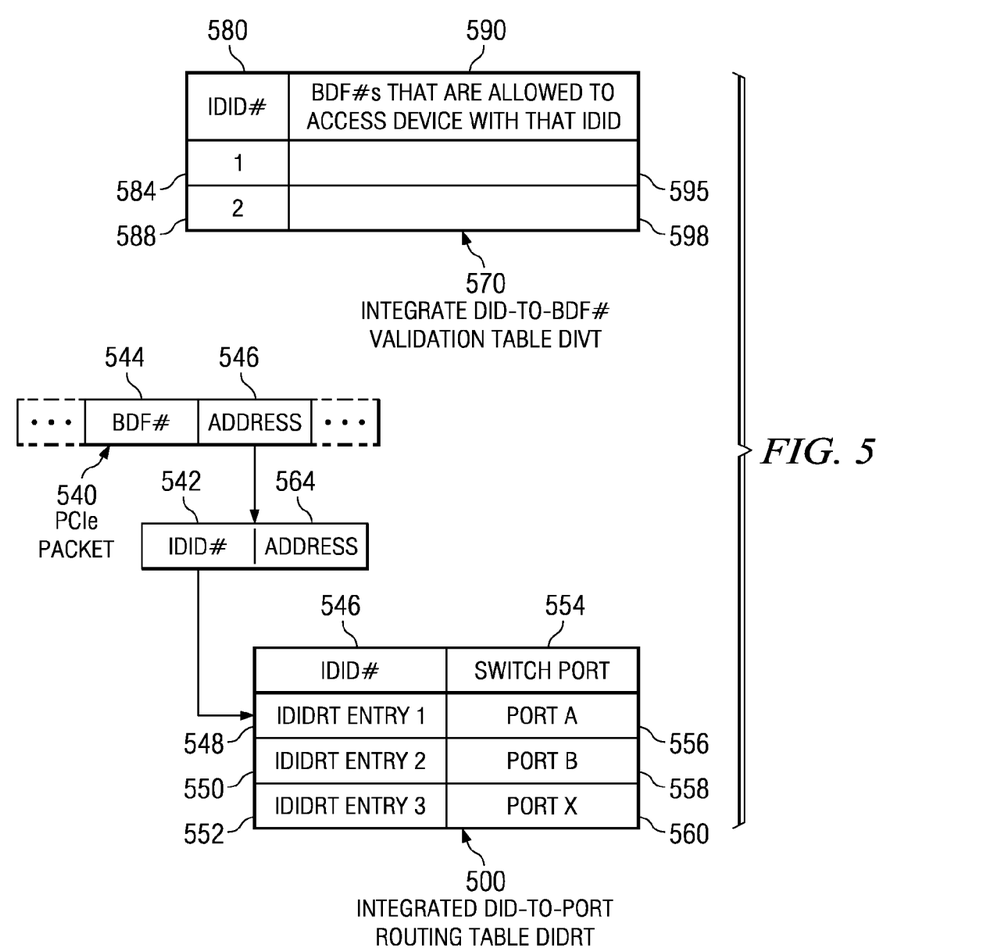
FIG. 5 is a schematic diagram showing a PCI-E transaction packet, together with a simplified Integrated Destination ID Routing Table and a simplified Integrated Destination ID Validation Table, according to an embodiment of the invention.

FIG. 3 further shows switch 302 provided with an Integrated Destination Identifier-to-Port Routing Table (IDIRT) 382. Switch 304 is similarly provided with an IDIRT 384. The IDIRTs, described hereinafter in greater detail in connection with FIGS. 4 and 5, are set up for routing PCI packets using integrated DID. More particularly, each IDIRT contains entries that pertain to specific hosts and adapters.

Referring further to FIG. 3, there are shown host CPU sets 332, 334 and 336, each containing a single or a plurality of system images (SIs). Thus, host set 332 contains system image SI 1 and SI 2, host set 334 contains system image SI 3, and host set 336 contains system images SI 4 and SI 5. It is to be understood that each system image is equivalent or corresponds to a partition, such as partitions 212-218, as described above in connection with FIG. 2. Each system image is also equivalent to a host. Thus, system images SI 1 and SI 2 are each equivalent to one of the hosts of host CPU set 332.

Each of the host CPU sets has an associated root complex as described above, through which the system images of respective hosts interface with or access the I/O fabric 144. More particularly, host sets 332-336 are interconnected to RCs 338-342, respectively. Root complex 338 has ports 344 and 346, and root complexes 340 and 342 each has only a single port, i.e. ports 348 and 350, respectively. Each of the host CPU sets, together with its corresponding root complex, comprises an example or instance of a root node, such as RNs 160-166 shown in FIG. 1. Moreover, host CPU set 332 is provided with a PCM 370 that is similar or identical to the PCM 148 of FIG. 1.

FIG. 3 further shows each of the RCs 338-342 connected to one of the ports 316-320, which respectively comprise ports of multi-root aware switch 304. Each of the multi-root aware switches 304 and 302 provides the capability to configure a PCI fabric such as I/O fabric 144 with multiple routings or data paths, in order to accommodate multiple root nodes.

Respective ports of a multi-root aware switch, such as switches 302 and 304, can be used as upstream ports, downstream ports, or both upstream and downstream ports. Generally, upstream ports are closer to a source of data and receive a data stream. Downstream ports are further from the data source and send out a data stream. Upstream/downstream ports can have characteristics of both upstream and downstream ports. In FIG. 3 ports 316, 318, 320, 326 and 308 are upstream ports. Ports 324, 312, 314, 328 and 330 are downstream ports, and ports 322 and 310 are upstream/downstream ports.

The ports configured as downstream ports are to be attached or connected to adapters or to the upstream port of another switch. In FIG. 3, multi-root aware switch 302 uses downstream port 312 to connect to an I/O adapter 352, which has two virtual I/O adapters or resources 354 and 356. Similarly, multi-root aware switch 302 uses downstream port 314 to connect to an I/O adapter 358, which has three virtual I/O adapters or resources 360, 362 and 364. Multi-root aware switch 304 uses downstream port 324 to connect to port 326 of switch 306. Multi-root aware switch 304 uses downstream ports 328 and 330 to connect to I/O adapter 366 and I/O adapter 368, respectively.

Each of the ports configured as an upstream port is used to connect to one of the root complexes 338-342. Thus, FIG. 3 shows multi-root aware switch 302 using upstream port 308 to connect to port 344 of RC 338. Similarly, multi-root aware switch 304 uses upstream ports 316, 318 and 320 to respectively connect to port 346 of root complex 338, to the single port 348 of RC 340, and to the single port 350 of RC 342.

The ports configured as upstream/downstream ports are used to connect to the upstream/downstream port of another switch. Thus, FIG. 3 shows multi-root aware switch 302 using upstream/downstream port 310 to connect to upstream/downstream port 322 of multi-root aware switch 304.

I/O adapter 352 is shown as a virtualized I/O adapter, having its function 0 (F0) assigned and accessible to the system image S11, and its function 1 (F1) assigned and accessible to the system image SI 2. Similarly, I/O adapter 358 is shown as a virtualized I/O adapter, having its function 0 (F0) assigned and assessible to S13, its function 1 (F1) assigned and accessible to S14 and its function 3 (F3) assigned to SI 5. I/O adapter 366 is shown as a virtualized I/O adapter with its function F0 assigned and accessible to S12 and its function F1 assigned and accessible to S14. I/O adapter 368 is shown as a single function I/O adapter assigned and accessible to S15.

In a system such as distributed computer system 300, the PCM must query a PCI switch, to determine whether or not the switch supports use of integrated DID for routing packets. In system 300, switches 302 and 304 support integrated DID as described herein, but switch 306 does not.

Referring to FIG. 4, there is shown a schematic representation of a section or component 400 of an IDIRT, such as IDIRT 384 of switch 304. More particularly, FIG. 4 depicts PCI Bus Address spaces 402-410, each containing a total of 64 bits. Moreover, in FIG. 4 the bits in each address space are respectively grouped into the highest 16 bits and lowest 48 bits.

More specifically, it is essential to understand that in connection with the IDIRT, the higher order bits in the PCI address space (selected to be the highest 16 bits in this embodiment) are used to identify a destination. Thus, a switch receiving a PCIe Packet uses the high order bits, for example the upper 16 bits, of the address to select the port that routes to the correct destination. The remaining 48 bits of the address base will then be addresses that are used by that destination.

FIG. 4 further shows an address type for each PCI address space. This is done to emphasize that the address spaces of FIG. 4 can be used with different address types. Thus, addresses 402, 404 and 406 are each used with a root complex, whereas addresses 408 and 410 are each used with a virtual end point.

When a particular host connects to a switch that supports integrated DID, the PCM configures the switch so that one of the PBA address spaces of the IDIRT is assigned to the particular host. The PCM carries this out by creating an entry in the IDIRT for each connected host. Thus, an entry could be made that, as an example, assigns address space 402 of FIG. 4 to the host associated with SI 2 of host CPU set 332. Similarly, address space 404 could be assigned to the host associated with SI 3 of host set 334.

As stated above, when a PBA address space is assigned to a host, the highest 16 bits of the address space are thereafter used as a destination identifier or DID that is associated with the host. For example, the bits x0000 of space 402 could be the assigned DID to root complex 338. The switch would then report to the host that the lower 48 bits of the address space 402 are available for use with packets pertaining to root complex 338. Each root complex, such as root complexes 338, 340, and 342, is identified by the destination identifier and can use host virtualization to route incoming PCIe transactions to the appropriate host SI. In this arrangement, when an virtual end point, such as 354, initiates a PCIe memory transaction the adapter places the integrated DID in the upper 16 bits of the PCIe memory transaction's address field. The switches then use the IDIRT to route PCIe transaction to the root complex associated with the integrated DID.

When an adapter is connected to a switch capable of supporting integrated DID, the switch reports this event to the PCM. The PCM then places an entry in the switch IDIRT for each virtual end point and communicates to each root complex the set of virtual end points that are associated to that root complex, along with the integrated DID for each of those virtual end points. As a result of this action, the virtual end points adapter are "made visible" to each of the associated hosts, and can be accessed thereby. For example, the bits x0001 of space 408 could be the assigned DID to virtual end point 354. Each virtual end point, such as virtual end points 354, 356, 360, 362, 364, 350, 351, and 352, is identified by the destination identifier and can use host virtualization to route incoming PCIe transactions to the appropriate virtual end point. In this arrangement, when a root complex, such as 338, initiates a PCIe memory transaction the root complex places the integrated DID in the upper 16 bits of the PCIe memory transaction's address field. The switches then use the IDIRT to route PCIe transaction to the virtual end point associated with the integrated DID.

The PCM can query the IDIRT of a switch to determine what is in the switch configuration. Also, the PCM can modify entries in a switch IDIRT or can destroy or delete entries therein when those entries are no longer valid. Embodiments of the invention thus combine or aggregate multiple devices with a single DID number, to simplify routing lookup. Moreover, each host can only communicate to PCI addresses within its PCI address space segment. This is enforced at the switch containing the IDIRT, which is also referred to herein as a root switch. All PCIe component trees below a root switch are joined at the switch to form a single tree.

Referring to FIG. 5, there is shown a simplified IDIRT 500 in a root switch of system 300, wherein the root switch has received a PCIexpress packet 540. Packet 540 includes BDF and PBA fields 544 and 546, wherein a BDF number is an integer representing the bus, device and function of a PCI component. Packet 540 further includes an integrated DID number 542, as described above, that is shown to be located in the PBA address field. Packet 540 further includes a PCIe component address 564, as described above, that is shown to also be located in the PBA address field.

The Integrated DID number 542 of the packet is used by the switch to look up an entry in the IDIRT 500 that contains the switch port number to emit the packet out of. For example, if the Integrated DID number 542 points to IDIRT entry 1 548, then Port A 556 on the switch is used to emit the packet. FIG. 5 further shows entries 550 and 552 respectively corresponding to ports 558 and 560.

Before an outbound PCIe packet can be emitted from a port, the switch checks if the port can accept PCIe packets from the BDF# contained in the inbound PCIe packet 540. The switch performs this function by using the Integrated DID 542 to look up an entry in the Integrated DID-to-BDF# Validation Table (IDIVT) 570 and comparing the BDF# 544 from the incoming packet 540 to the list of BDFs 590 in the IDIVT 570. IDID numbers 584 and 588 respectively correspond to BDF numbers 595 and 598.

Figure 6:
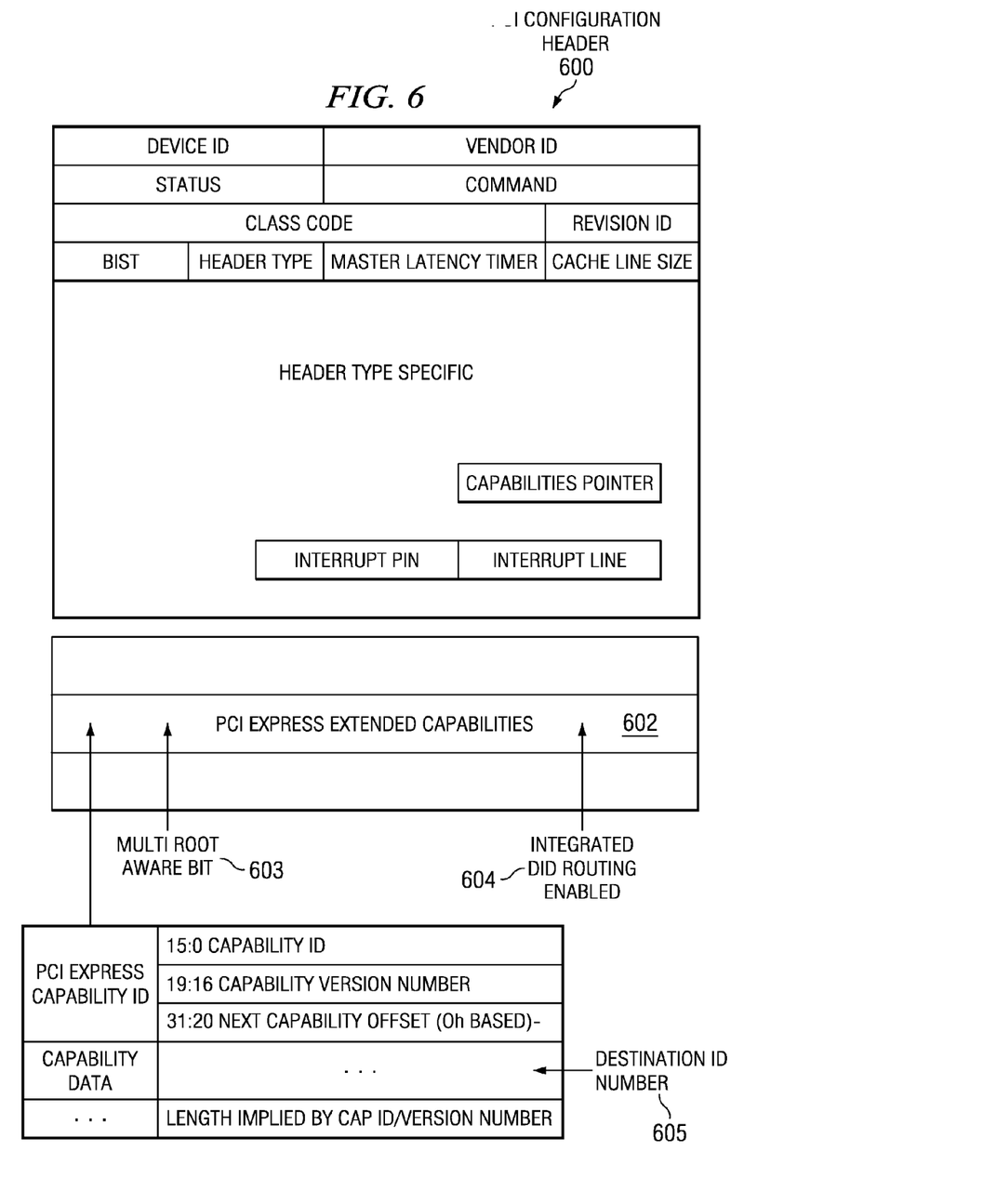
FIG. 6 illustrates a PCI configuration header according to an exemplary embodiment of the present invention.

FIG. 6 illustrates a PCI configuration header according to an exemplary embodiment of the present invention. The PCI configuration header is generally designated by reference number 600, and PCI Express starts its extended capabilities 602 at a fixed address in PCI configuration header 600. These can be used to determine if the PCI component is a multi-root aware PCI component and if the device supports Integrated DID-based routing. If the PCI Express extended capabilities 602 has multi-root aware bit 603 set and Integrated DID based routing supported bit 604 then the IDID# for the device can be stored in the PCI Express Extended Capabilities area 605. It should be understood, however, that the present invention is not limited to the herein described scenario where the PCI extended capabilities are used to define the IDID. Any other field could be redefined or reserved fields used for the Integrated Destination ID field implementation on other specifications for PCI.

The present invention is directed to a method and system for managing the routing of data in a distributed computing system, for example, a distributed computing system that uses PCI Express protocol to communicate over an I/O fabric, to reflect modifications made to the distributed computing system. In particular, the present invention provides a mechanism for managing the Integrated Destination ID field included in the above-described data routing mechanism to ensure that the routing mechanism properly reflects modifications made in the distributed computing system that affects the routing of data through the system such as transferring IOAs from one host to another, or adding or removing hosts and/or IOAs from the system.

Figure 7:
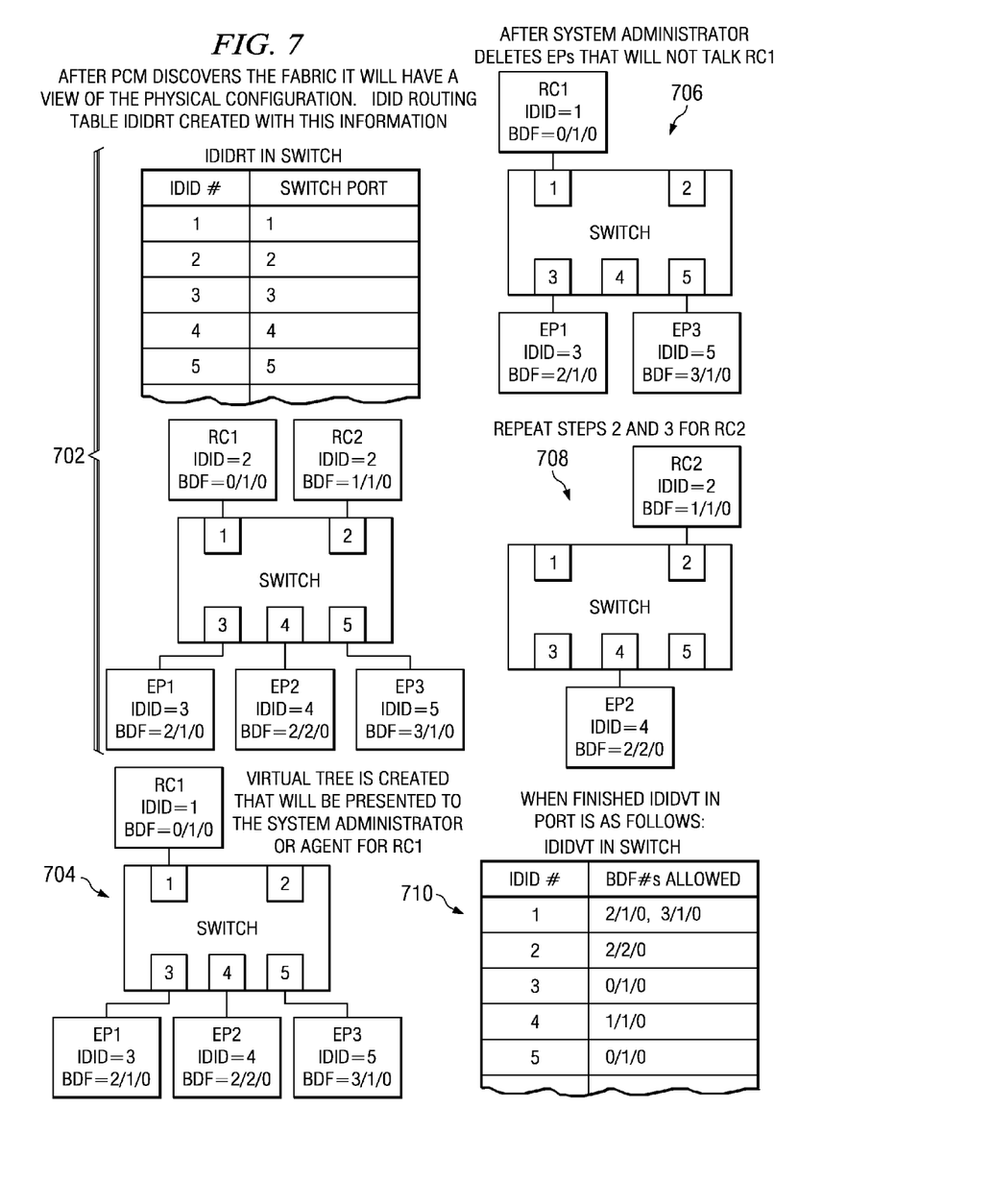
FIG. 7 presents diagrams that schematically illustrate a system for managing the routing of data in a distributed computing system according to an exemplary embodiment of the present invention.

FIG. 7 presents diagrams that schematically illustrate a system for managing the routing of data in a distributed computing system according to an exemplary embodiment of the present invention. In particular, FIG. 7 illustrates a specific example of how a routing mechanism in the distributed computing system is altered to reflect a change in an association between a root complex and an IOA in the distributed computing system.

As shown in diagram 702, the PCI Configuration Manager (PCM) first creates an Integrated DID Routing Table (ID-IDRT) representing a tree indicative of the current physical configuration of the distributed computing system. The PCM creates this table by discovering the current configuration of the I/O fabric so that it will have a full view of the physical configuration of the fabric, and then creates the IDIDRT from this information. The manner in which this may be accomplished is described in detail in commonly assigned, copending U.S. patent application Ser. No. 11/260,624, the disclosure of which is hereby incorporated by reference. In the physical tree shown in diagram 702, it is assumed that End Point 1 (EP 1) and EP 3 be assigned to RC 1, and that EP 2 be assigned to RC 2. The PCM then creates a virtual tree from the physical tree to be presented to an administrator or agent for RC1 as shown in diagram 704. It will be noted that this configuration is the same as the physical configuration shown in diagram 702, but is now virtual.

The system administrator or agent for RC 1 then modifies the virtual tree by deleting EP 2 so that it cannot communicate with RC 1 as shown in diagram 706. The PCM then creates a new IDID Validation Table (IDIDVT) to reflect the modification of the virtual tree.

The procedure illustrated in diagrams 704 and 706 is then repeated for RC 2. In particular, the PCM presents a virtual tree to the system administrator or agent for RC 2, and the system administrator or agent modifies the virtual tree by deleting EP 1 and EP 3 so that they cannot communicate with RC 2 as shown in diagram 708.

When the above-described process has been completed for all RCs in the physical tree, the IDIDVT in the switch will be as shown in diagram 710 wherein the IDIDVT validates RC 1 to communicate with EP 1 and EP 3 and vice versa, and validates RC 2 to communicate with EP 2 and vice versa. It should be understood that although only two RCs and three EPs are included in the physical tree in FIG. 7, this is intended to be exemplary only, as the tree may include any desired number of RCs and EPs.

Figure 8:
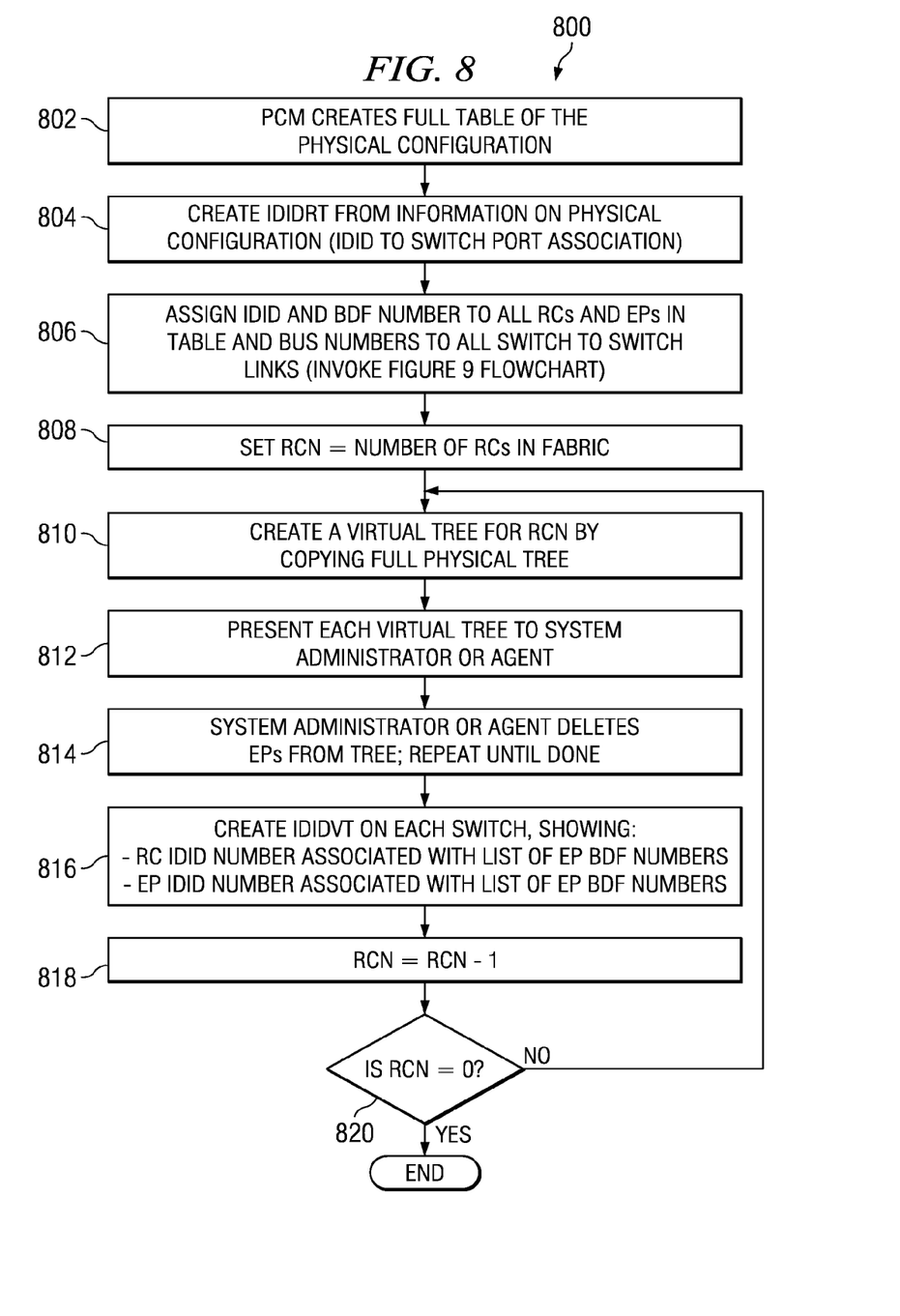
FIG. 8 is a flowchart that illustrates a method for managing the routing of data in a distributed computing system according to an exemplary embodiment of the present invention.

FIG. 8 is a flowchart that illustrates a method for managing the routing of data in a distributed computing system according to an exemplary embodiment of the present invention. The method is generally designated by reference number 800, and begins by the PCM creating a full table of the physical configuration of the I/O fabric utilizing the mechanism described in the above-referenced commonly assigned, copending U.S. patent application Ser. No. 11/260,624 (Step 802). The PCM then creates an IDIDRT from the information on physical configuration to make "IDID-toswitch port" associations (Step 804). An IDID and BDF# is then assigned to all RCs and EPs in the IDIDRT and Bus#s are assigned to all switch to switch links (Step 806).

Figure 9:
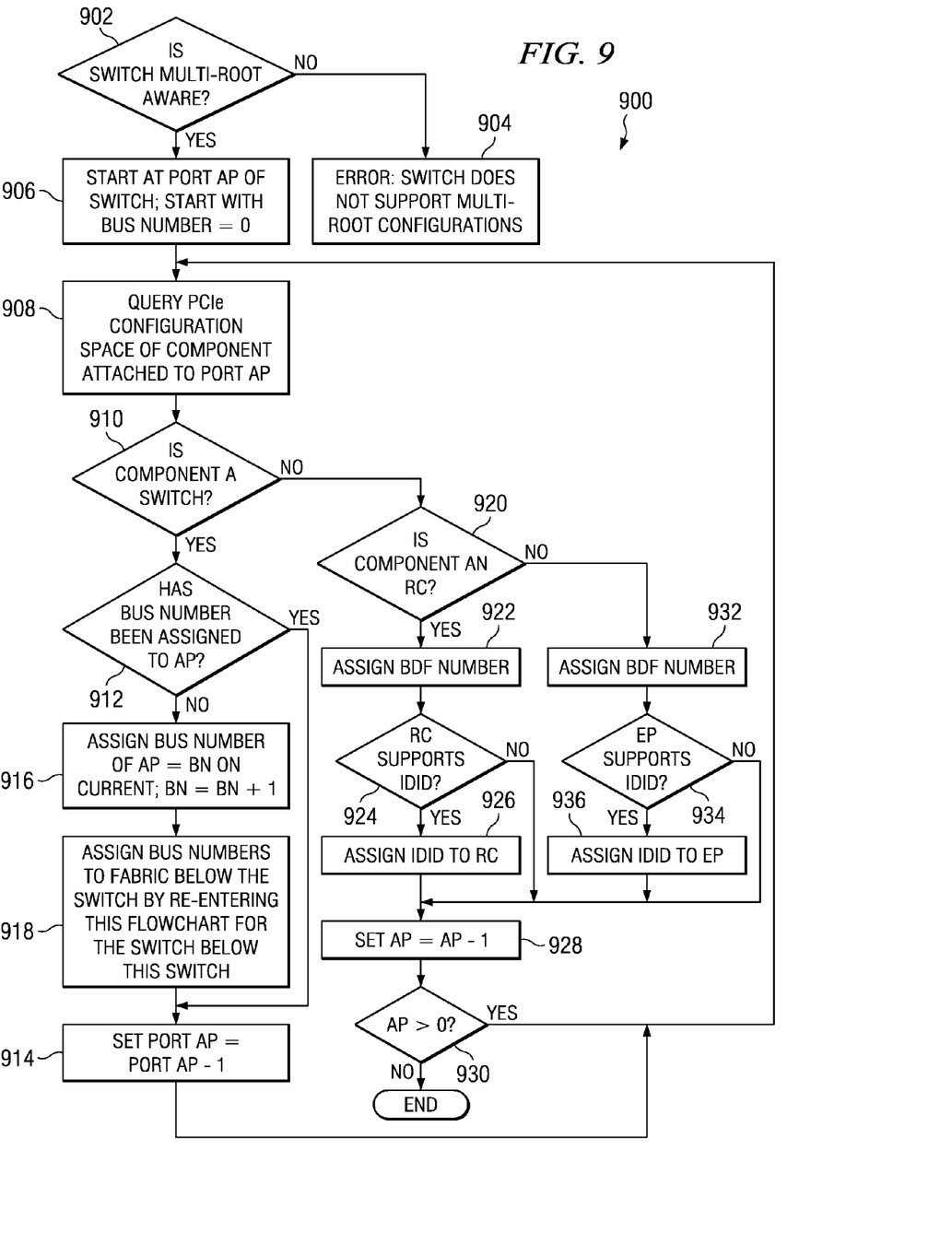
FIG. 9 is a flowchart that illustrates a method for assigning source and destination identifiers in connection with managing the routing of data in a distributed computing system according to an exemplary embodiment of the present invention.

FIG. 9 is a flowchart that illustrates a method for assigning source and destination identifiers in connection with managing the routing of data in a distributed computing system according to an exemplary embodiment of the present invention. The method is generally designated by reference number 900 and may be implemented as Step 806 in FIG. 8.

Referring to FIG. 9, a determination is first made whether the switch is multi-root aware (Step 902). If the switch is not multi-root aware (No output of Step 902), the method finishes with an error (Step 904) because the switch will not support multi-root configurations.

If the switch is multi-root aware (Yes output of Step 902), the PCM begins at Port AP (AP=Active Port) of the switch, and starts with Bus#=0 (Step 906). The PCM then queries the PCIe Configuration Space of the component attached to port AP (Step 908). A determination is made whether the component is a switch (Step 910). If the component is a switch (Yes output of Step 910), a determination is made whether a Bus# has been assigned to port AP (Step 912). If a Bus# has been assigned to port AP (Yes output of Step 912), port AP is set equal to port AP−1 (Step 914), and the method returns to Step 908 to repeat the method with the next port.

If a Bus# has not been assigned to port AP (No output of Step 912), a Bus # of AP=BN is assigned on current; BN=BN+1 (Step 916), and Bus#s are assigned to the I/O fabric below the switch by re-entering this method for the switch below the switch (Step 918). Port AP is then set equal to port AP−1 (Step 914), and the method returns to Step 908 to repeat the method with the next port.

If the component is determined not to be a switch (No output to Step 910), a determination is made whether the component is an RC (Step 920). If the component is an RC (Yes output of Step 920), a BDF# is assigned (Step 922) and a determination is made whether the RC supports the IDID (Step 924). If the RC does support the IDID (Yes output of Step 924), the IDID is assigned to the RC (Step 926). The AP is then set to be equal to AP−1 (Step 928), and a determination is made whether the AP is greater than 0 (Step 930). If the AP is not greater than 0 (No output of Step 930), the method ends. If the AP is greater than 0 (Yes output of Step 930), the method returns to Step 908 to query the PCIe configuration Space of the component attached to the next port.

If the RC does not support IDID (No output of Step 924), the AP is set=AP−1 (Step 928), and the process continues as described above.

Meanwhile, if the component is determined not to be an RC (No output of Step 920), a BDF# is assigned (Step 932), and a determination is made whether the EP supports IDID (Step 934). If the EP supports IDID (Yes output of Step 934), the IDID is assigned to each Virtual EP (Step 936). The AP is set=AP−1 (Step 928), and the process continues from there as described above.

If the EP does not support IDID (No output of Step 934), the AP is set=AP−1 (Step 928), and the process continues as described above.

Returning back to FIG. 8, after an IDID and BDF# has been assigned to all RCs and EPs in the IDIDRT, and Bus#s are assigned to all switch to switch links (Step 806), the RCN is set to the number of RCs in the fabric (Step 808), and a virtual tree is created for the RCN by copying the full physical tree (Step 810). The virtual tree is then presented to the administrator or agent for the RC (Step 812). The system administrator or agent deletes EPs from the tree (Step 814), and a similar process is repeated until the virtual tree has been fully modified as desired.

A IDIDVT is then created on each switch showing the RC IDID# associated with the list of EP BDFs, and EP IDID# associated with the list of EP BDF#s (Step 816). The RCN is then made equal to RCN−1 (Step 818), and a determination is made whether RCN=0 (Step 820). If the RCN=0 (Yes output of Step 820), the method ends. If RCN does not equal 0 (No output of Step 820), the method returns to Step 810, and a virtual tree is created by copying the next physical tree and repeating the subsequent steps for the next virtual tree.

The present invention thus provides a method and system for managing the routing of data in a distributed computing system, such as a distributed computing system that uses PCI Express protocol to communicate over an I/O fabric. A physical tree that is indicative of a physical configuration of the distributed computing system is determined, and a virtual tree is created from the physical tree. The virtual tree is then modified to change an association between at least one source device and at least one target device in the virtual tree. A validation mechanism validates the changed association between the at least one source device and the at least one target device to enable routing of data from the at least one source device to the at least one target device.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method of communicating with peripheral adapters via peripheral component interconnect express (PCIe) switches in a multi-host system, the method comprising:
   maintaining a routing table for operating a PCIe switch interconnecting multiple hosts and the peripheral adapters, wherein the routing table stores port numbers for selecting a routing through the PCIe switch indexed by a destination identifier, wherein the destination identifier identifies a particular one of the multiple hosts and the port numbers identify corresponding ones of the multiple hosts;
   receiving a PCIe transaction packet at the PCIe switch from one of the PCIe adapters;
   retrieving a particular port number from the routing table by using a set of bits within the bus address of the received PCIe transaction packet that specify the destination identifier; and
   forwarding the PCIe transaction packet to a particular one of the multiple hosts corresponding to the retrieved port number.

2. The method of claim 1, wherein the set of bits is a set of adjacent bits, whereby an address range within the address space of the bus address is allocated to a corresponding one of the multiple hosts.

3. The method of claim 2, wherein the maintaining further comprises:
   determining when each of the multiple hosts has established a connection with the PCIe switch; and
   allocating a different address range within the address space of the bus address to each of the multiple hosts.

4. The method of claim 1, wherein the maintaining is performed by a configuration manager associated with the PCIe switch.

5. The method of claim 1, further comprising:
   responsive to the retrieving, determining whether the retrieved port number specifies a port that supports a connection to a particular bus-device-function (BDF) number; and
   performing the forwarding only if the specified port supports the connection.

6. The method of claim 1, further comprising:
   determining whether the PCIe switch is capable of supporting multiple PCIe root nodes;
   responsive to determining that the PCIe switch is not capable of supporting multiple PCIe root nodes, generating an error condition; and
   responsive to determining that the PCIe switch is capable of supporting multiple PCIe root nodes, assigning destination identifiers to root complexes below the PCIe switch.

7. A computer system, including: peripheral adapters connected via peripheral component interconnect express (PCIe) switches to multiple hosts within the computer system; and
   a PCIe switch that maintains a routing table for operating the PCIe switch to interconnect the multiple hosts and the peripheral adapters, wherein the routing table stores port numbers for selecting a routing through the PCIe switch indexed by a destination identifier, wherein the destination identifier identifies a particular one of the multiple hosts and the port numbers identify corresponding ones of the multiple hosts,
   wherein the PCIe switch receives a PCIe transaction packet at the PCIe switch from one of the PCIe adapters, retrieves a particular port number from the routing table by using a set of bits within the bus address of the received PCIe transaction packet that specify the destination identifier, and
   forwards the PCIe transaction packet to a particular one of the multiple hosts corresponding to the retrieved port number.

8. The computer system of claim 7, wherein the set of bits is a set of adjacent bits, whereby an address range within the address space of the bus address is allocated to a corresponding one of the multiple hosts.

9. The computer system of claim 8, wherein the PCIe switch further determines when each of the multiple hosts has established a connection with the PCIe switch, and allocates a different address range within the address space of the bus address to each of the multiple hosts.

10. The computer system of claim 7, wherein the PCIe switch is associated with a configuration manager that maintains the routing table.

11. The computer system method of claim 7, wherein the PCIe switch responsive to the retrieving of the port number, determines whether the retrieved port number specifies a port that supports a connection to a particular bus-device-function (BDF) number, and performs the forwarding only if the specified port supports the connection.

12. The computer system of claim 7, further comprising program instructions stored in a memory of the computer system for execution by a processor of the computer system, wherein the program instructions comprise program instructions for:
   determining whether the PCIe switch is capable of supporting multiple PCIe root nodes;
   responsive to determining that the PCIe switch is not capable of supporting multiple PCIe root nodes, generating an error condition; and
   responsive to determining that the PCIe switch is capable of supporting multiple PCIe root nodes, assigning destination identifiers to root complexes below the PCIe switch.

13. A non-transitory computer readable storage containing program instructions for execution within a computer system including peripheral adapters connected via peripheral component interconnect express (PCIe) switches to multiple hosts within the computer system, the program instructions comprising program instructions for:
   maintaining a routing table for operating a PCIe switch interconnecting multiple hosts and the peripheral adapters, wherein the routing table stores port numbers for selecting a routing through the PCIe switch indexed by a destination identifier, wherein the destination identifier identifies a particular one of the multiple hosts and the port numbers identify corresponding ones of the multiple hosts;
   receiving a PCIe transaction packet at the PCIe switch from one of the PCIe adapters;
   retrieving a particular port number from the routing table by using a set of bits within the bus address of the received PCIe transaction packet that specify the destination identifier; and
   forwarding the PCIe transaction packet to a particular one of the multiple hosts corresponding to the retrieved port number.

14. The computer program product of claim 13, wherein the set of bits is a set of adjacent bits, whereby an address range within the address space of the bus address is allocated to a corresponding one of the multiple hosts.

15. The computer program product of claim 14, wherein the program instructions for maintaining further comprise program instructions for:
- determining when each of the multiple hosts has established a connection with the PCIe switch; and
- allocating a different address range within the address space of the bus address to each of the multiple hosts.

16. The computer program product of claim 13, wherein the program instructions for maintaining are part of a configuration manager associated with the PCIe switch.

17. The computer program product of claim 13, wherein the program instructions further comprise program instructions for:
- responsive to the retrieving, determining whether the retrieved port number specifies a port that supports a connection to a particular bus-device-function (BDF) number; and
- performing the forwarding only if the specified port supports the connection.

18. The computer program product of claim 13, wherein the program instructions further comprise program instructions for:
- determining whether the PCIe switch is capable of supporting multiple PCIe root nodes;
- responsive to determining that the PCIe switch is not capable of supporting multiple PCIe root nodes, generating an error condition; and
- responsive to determining that the PCIe switch is capable of supporting multiple PCIe root nodes, assigning destination identifiers to root complexes below the PCIe switch.

* * * * *